US012658504B2

(12) United States Patent 
Ogihara

(10) Patent No.: US 12,658,504 B2 
(45) Date of Patent: Jun. 16, 2026

(54) TEMPERATURE ADJUSTING DEVICE AND VEHICLE

(71) Applicant: HONDA MOTOR CO., LTD., Tokyo (JP)

(72) Inventor: Yasushi Ogihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 579 days.

(21) Appl. No.: 18/125,765

(22) Filed: Mar. 24, 2023

(65) Prior Publication Data

US 2023/0318088 A1 Oct. 5, 2023

(30) Foreign Application Priority Data

Mar. 31, 2022 (JP) ................................. 2022-059316

(51) Int. Cl. 
H01M 10/6568 (2014.01) 
B60L 50/60 (2019.01) 
(Continued)

(52) U.S. Cl. 
CPC ......... H01M 10/6568 (2015.04); B60L 50/60 (2019.02); H01M 10/46 (2013.01); 
(Continued)

(58) Field of Classification Search 
None 
See application file for complete search history.

(56) References Cited

U.S. PATENT DOCUMENTS 11,752,850 B2 * 9/2023 Wang ....................... B60K 1/02 
180/68.5 
2011/0296855 A1 * 12/2011 Johnston ................. B60L 50/40 
62/160

(Continued)

FOREIGN PATENT DOCUMENTS

CN 113580871 A * 11/2021 ............... B60H 1/04 
CN 113580872 A * 11/2021 ......... B60H 1/00271 
(Continued)

OTHER PUBLICATIONS

JP-2013119259-A English machine translation (Year: 2013).* 
Japanese Office Action for Japanese Patent Application No. 2022-059316 mailed Jan. 23, 2024.

*Primary Examiner* — Scott J. Chmielecki 
(74) *Attorney, Agent, or Firm* — Amin, Turocy & Watson, LLP

(57) ABSTRACT

A temperature adjusting device includes temperature adjusting circuit that circulates heating medium, a first temperature sensor that measures temperature of the heating medium, a battery thermally connected to the temperature adjusting circuit, a second temperature sensor that measures temperature of the battery, a heat generating instrument thermally connected to the temperature adjusting circuit, flow channel switching device that switches flow channel of the temperature adjusting circuit to form first temperature adjusting circuit that circulates the heating medium in sequence of the battery and the heat generating instrument and second temperature adjusting circuit that circulates the heating medium in sequence of the heat generating instrument and the battery, and a control device that controls the flow channel switching device and switch the temperature adjusting circuit to the first temperature adjusting circuit or the second temperature adjusting circuit based on measurement results of the first temperature sensor and the second temperature sensor.

9 Claims, 6 Drawing Sheets

(51) Int. Cl.
| | |
|---|---|
| *B60R 16/033* | (2006.01) |
| *H01M 10/46* | (2006.01) |
| *H01M 10/48* | (2006.01) |
| *H01M 10/615* | (2014.01) |
| *H01M 10/625* | (2014.01) |
| *H01M 10/6551* | (2014.01) |

(52) U.S. Cl.
CPC ....... *H01M 10/486* (2013.01); *H01M 10/615* (2015.04); *H01M 10/625* (2015.04); *H01M 10/6551* (2015.04); *B60R 16/033* (2013.01); *H01M 2220/20* (2013.01)

(56) References Cited

U.S. PATENT DOCUMENTS

2012/0205088 A1* 8/2012 Morisita ................... B60L 1/02
62/243

2012/0327596 A1* 12/2012 Anderson-Straley .......................
H01M 10/625
361/689
2014/0374081 A1* 12/2014 Kakehashi ......... B60H 1/00278
429/120
2015/0000327 A1* 1/2015 Kakehashi .......... H01M 10/625
62/434
2020/0238818 A1 7/2020 Takazawa et al.
2020/0406783 A1 12/2020 Tokozakura
2021/0206292 A1* 7/2021 Beyer ............... H01M 10/6552
2021/0300150 A1* 9/2021 Morrow .............. H01M 10/663
2024/0154450 A1* 5/2024 Imanaka ................... H02J 7/65

FOREIGN PATENT DOCUMENTS

| | | |
|---|---|---|
| CN | 214564592 | 11/2021 |
| JP | 2013-119259 | 6/2013 |
| JP | 2013119259 A * | 6/2013 |
| JP | 2019-023059 | 2/2019 |
| JP | 2020-117167 | 8/2020 |
| JP | 2021-005927 | 1/2021 |

* cited by examiner

TEMPERATURE ADJUSTING DEVICE AND VEHICLE

CROSS-REFERENCE TO RELATED APPLICATION

Priority is claimed on Japanese Patent Application No. 2022-059316, filed Mar. 31, 2022, the content of which is incorporated herein by reference.

BACKGROUND OF THE INVENTION

Field of the Invention

The present invention relates to a temperature adjusting device and a vehicle.

Description of Related Art

In recent years, in order to ensure access to affordable, reliable, sustainable and advanced energy for more people, research and development has been carried out on secondary batteries that contribute to energy efficiency.

Japanese Unexamined Patent Application, First Publication No. 2019-23059 discloses a cooling water flow channel that includes a first cooling water flow channel configured to cool a battery, and a second cooling water flow channel configured to cool a motor generator and an inverter, and that is configured to connect or separate the first cooling water flow channel and the second cooling water flow channel to/from each other according to an outdoor temperature or a battery water temperature.

SUMMARY OF THE INVENTION

Incidentally, since the battery and heat generating instruments (the motor generator, the inverter, and the like) have different management temperatures, they have two cooling water flow channels as described above. In addition, since the battery generally has a management temperature lower than that of the heat generating instrument, when the two cooling water flow channels are connected, the battery is disposed upstream from the heat generating instrument. However, as represented by the solid-state battery in recent years, the management temperature of the battery tends to become higher and in a case the management temperatures of the battery and the heat generating instrument become the same or reversed, the cooling water flow channels as described above may not be able to manage the temperature appropriately.

An aspect of the present application is directed to providing a temperature adjusting device with high response capability, which is capable of appropriately managing temperatures of a battery and a heat generating instrument. Then, the aspect of the present application contributes to energy efficiency.

A temperature adjusting device and a vehicle according to the present invention employ the following configurations.

(1) A temperature adjusting device according to an aspect of the present invention includes a temperature adjusting circuit configured to circulate a heating medium: a first temperature sensor configured to measure a temperature of the heating medium; a battery thermally connected to the temperature adjusting circuit: a second temperature sensor configured to measure a temperature of the battery: a heat generating instrument thermally connected to the temperature adjusting circuit: a flow channel switching device configured to switch a flow channel of the temperature adjusting circuit so as to form a first temperature adjusting circuit configured to circulate the heating medium in sequence of the battery and the heat generating instrument and a second temperature adjusting circuit configured to circulate the heating medium in sequence of the heat generating instrument and the battery; and a control device configured to control the flow channel switching device and to switch the temperature adjusting circuit to the first temperature adjusting circuit or the second temperature adjusting circuit on the basis of measurement results of the first temperature sensor and the second temperature sensor.

(2) In the aspect of the above-mentioned (1), the heat generating instrument may have a thermal capacity smaller than that of the battery.

(3) In the aspect of the above-mentioned (2), in a case the measurement result of the first temperature sensor is a first threshold or more and the measurement result of the second temperature sensor is less than the first threshold, the control device may control the flow channel switching device and switch the temperature adjusting circuit from the first temperature adjusting circuit to the second temperature adjusting circuit.

(4) In the aspect of the above-mentioned (1) to (3), a radiator thermally connected to the temperature adjusting circuit and configured to cool the heating medium; and an opening/closing device configured to open and close the radiator may be provided.

(5) In the aspect of the above-mentioned (4), the control device may further control the opening/closing device and open and close the radiator on the basis of the measurement results of the first temperature sensor and the second temperature sensor.

(6) In the aspect of the above-mentioned (5), in a case the measurement result of the first temperature sensor is a second threshold or more or the measurement result of the second temperature sensor is the second threshold or more, the control device may control the opening/closing device and switch the radiator from a closed state to an open state.

(7) In the aspect of the above-mentioned (1) to (6), the heat generating instrument may include a driving device configured to drive a motor.

(8) In the aspect of the above-mentioned (1) to (7), the heat generating instrument may include a charging device that is electrically connected to an external power supply and that is configured to charge the battery.

(9) A vehicle according to an aspect of the present invention includes the temperature adjusting device according to the aspects of the above-mentioned (1) to (8).

According to the aspects of the above-mentioned (1) to (9), it is possible to switch upstream or downstream of the battery and the heat generating instrument in the temperature adjusting circuit on the basis of the temperature of the heating medium and the temperature of the battery. Accordingly, it is possible to provide a temperature adjusting device with high response capability, which is capable of appropriately managing the temperatures of the battery and the heat generating instrument.

DETAILED DESCRIPTION OF THE INVENTION

Hereinafter, an embodiment of the present invention will be described with reference to the accompanying drawings.

Figure 1:
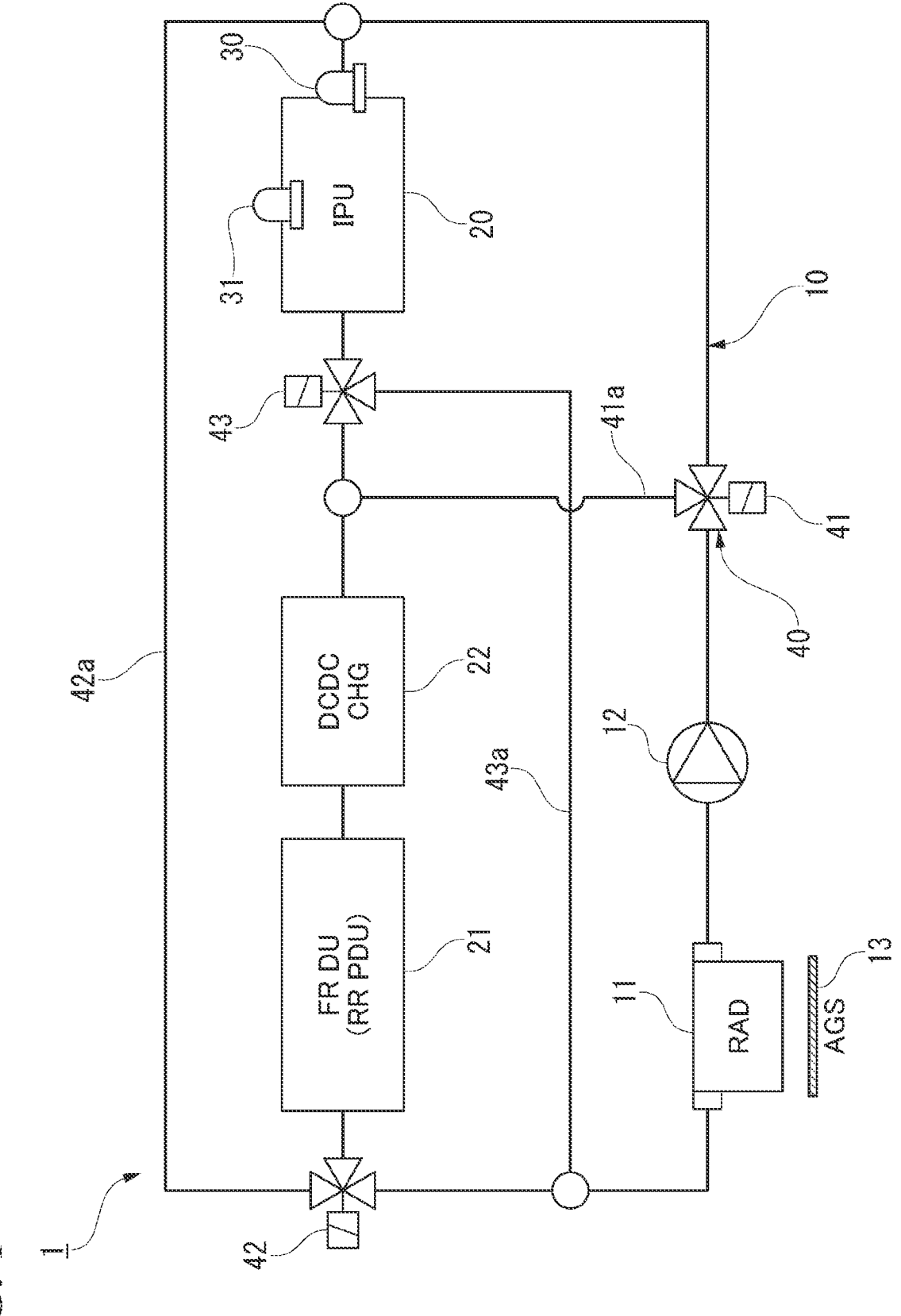
FIG. 1 is a circuit diagram showing a configuration of a temperature adjusting device according to an embodiment.

FIG. 1 is a circuit diagram showing a configuration of a temperature adjusting device 1 according to an embodiment.

The temperature adjusting device 1 is mounted on a vehicle (not shown). The vehicle may be, for example, an electric vehicle having a motor only as a driving source, or may be a hybrid vehicle having a motor and an internal combustion engine.

As shown in FIG. 1, the temperature adjusting device 1 includes a temperature adjusting circuit 10 configured to circulate a heating medium. A battery (IPU) 20 is thermally connected to the temperature adjusting circuit 10. In addition, a driving device 21 or a charging device 22 is thermally connected to the temperature adjusting circuit 10 as a heat generating instrument.

The battery 20 supplies electric power to at least one of an electronic equipment system, an air-conditioning system, and a driving system of the vehicle. The battery 20 is a chargeable/dischargeable secondary battery. The secondary battery is preferably a solid-state battery having a wide management temperature range upon charging/discharging. The solid-state battery is a battery filled with a solid electrolyte between a positive electrode and a negative electrode with no electrolytic liquid. Further, the secondary battery may be an existing lithium ion battery or the like with a electrolytic liquid.

The driving device 21 is electrically connected to the battery 20, and drives a motor 23 (see FIG. 2 and FIG. 6) of the vehicle. The driving device 21 includes an inverter (electric power converting apparatus) configured to convert direct current electric power into alternating current electric power and convert alternating current electric power into direct current electric power. The charging device 22 is electrically connected to the battery 20, and charges the battery 20 when electrically connected to an external power supply (not shown). The charging device 22 includes a DC/DC converter that steps up or steps down the direct current voltage.

These heat generating instruments (the driving device 21, the charging device 22) have a thermal capacity smaller than that of the battery 20. In the embodiment, each of the driving device 21 and the charging device 22 has a thermal capacity smaller than that of the battery 20. In addition, even when the thermal capacities of the driving device 21 and the charging device 22 are combined, the combined thermal capacity is smaller than that of the battery 20.

The temperature adjusting circuit 10 includes a radiator (RAD) 11, a pump 12, and a flow channel switching device 40. The radiator 11 is thermally connected to the temperature adjusting circuit 10. The radiator 11 cools a heating medium by exchanging heat between the heating medium and external air. The heating medium is, for example, water, radiator liquid, coolant, or the like. The pump 12 is disposed on a downstream side of the radiator 11 in the temperature adjusting circuit 10. The pump 12 circulates a heating medium in the temperature adjusting circuit 10.

The temperature adjusting device 1 includes an opening/closing device (AGS) 13 configured to open and close the radiator 11. The opening/closing device 13 is, for example, an active grill shutter (AGS), and opens and closes a ventilating hole through which external air is taken into the radiator 11. Further, the opening/closing device 13 is not limited to the active grill shutter as long as it is a shutter structure capable of opening and closing the radiator 11.

In addition, the temperature adjusting device 1 includes a plurality of temperature sensors 30 and 31. The temperature sensor 30 is installed at an inlet of the battery 20 in the temperature adjusting circuit 10, and measures a temperature of the heating medium. In addition, the temperature sensor 31 is installed on the battery 20, and measures a temperature of the battery 20.

The flow channel switching device 40 includes a first flow channel switching valve 41 and a first bypass flow channel 41a, a second flow channel switching valve 42 and a second bypass flow channel 42a, and a third flow channel switching valve 43 and a third bypass flow channel 43a.

The first flow channel switching valve 41 is an electrically-driven multi-way valve (in the embodiment, a three-way valve) disposed on a downstream side of the pump 12. The first flow channel switching valve 41 guides a heating medium sent out of the pump 12 to an upstream side of the battery 20 or a downstream side of the battery via the first bypass flow channel 41a.

The second flow channel switching valve 42 is an electrically-driven multi-way valve (in the embodiment, a three-way valve) disposed on a downstream side of the driving device (FR DU, RR PDU) 21. The second flow channel switching valve 42 guides a heating medium flowing through the driving device 21 to an upstream side of the radiator 11 or an upstream side of the battery via the second bypass flow channel 42a.

The third flow channel switching valve 43 is an electrically-driven multi-way valve (in the embodiment, a three-way valve) disposed on a downstream side of the battery 20 and an upstream side of a connecting position of the first bypass flow channel 41a. The third flow channel switching valve 43 guides a heating medium flowing through the battery 20 to an upstream side of the charging device (DCDC CHG) 22 or an upstream side of the radiator 11 via the third bypass flow channel 43a.

Next, a control system of the temperature adjusting device 1 of the above-mentioned configuration will be described.

Figure 2:
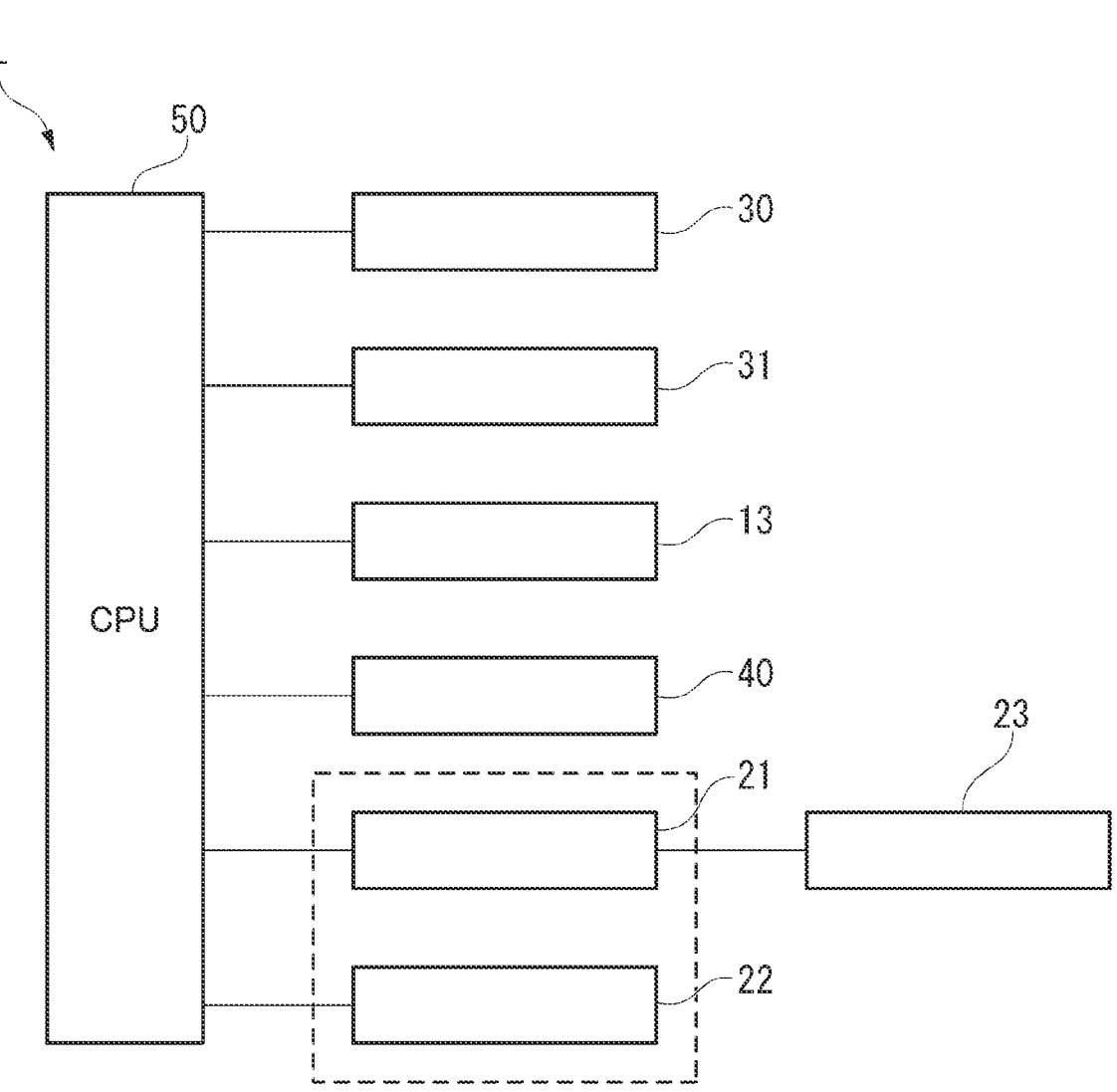
FIG. 2 is a block diagram showing a control system of the temperature adjusting device according to the embodiment.

FIG. 2 is a block diagram showing a control system of the temperature adjusting device 1 according to the embodiment.

As shown in FIG. 2, the temperature adjusting device 1 is electrically connected to the plurality of temperature sensors 30 and 31, the opening/closing device 13, and the flow channel switching device 40, and includes a control device 50 electrically connected to the battery 20 and the heat generating instruments (the driving device 21, the charging device 22).

The control device 50 controls the flow channel switching device 40 and switches the temperature adjusting circuit 10 to a first temperature adjusting circuit 10A or a second temperature adjusting circuit 10B on the basis of measurement results of the temperature sensor 30 and the temperature sensor 31.

Figure 3:
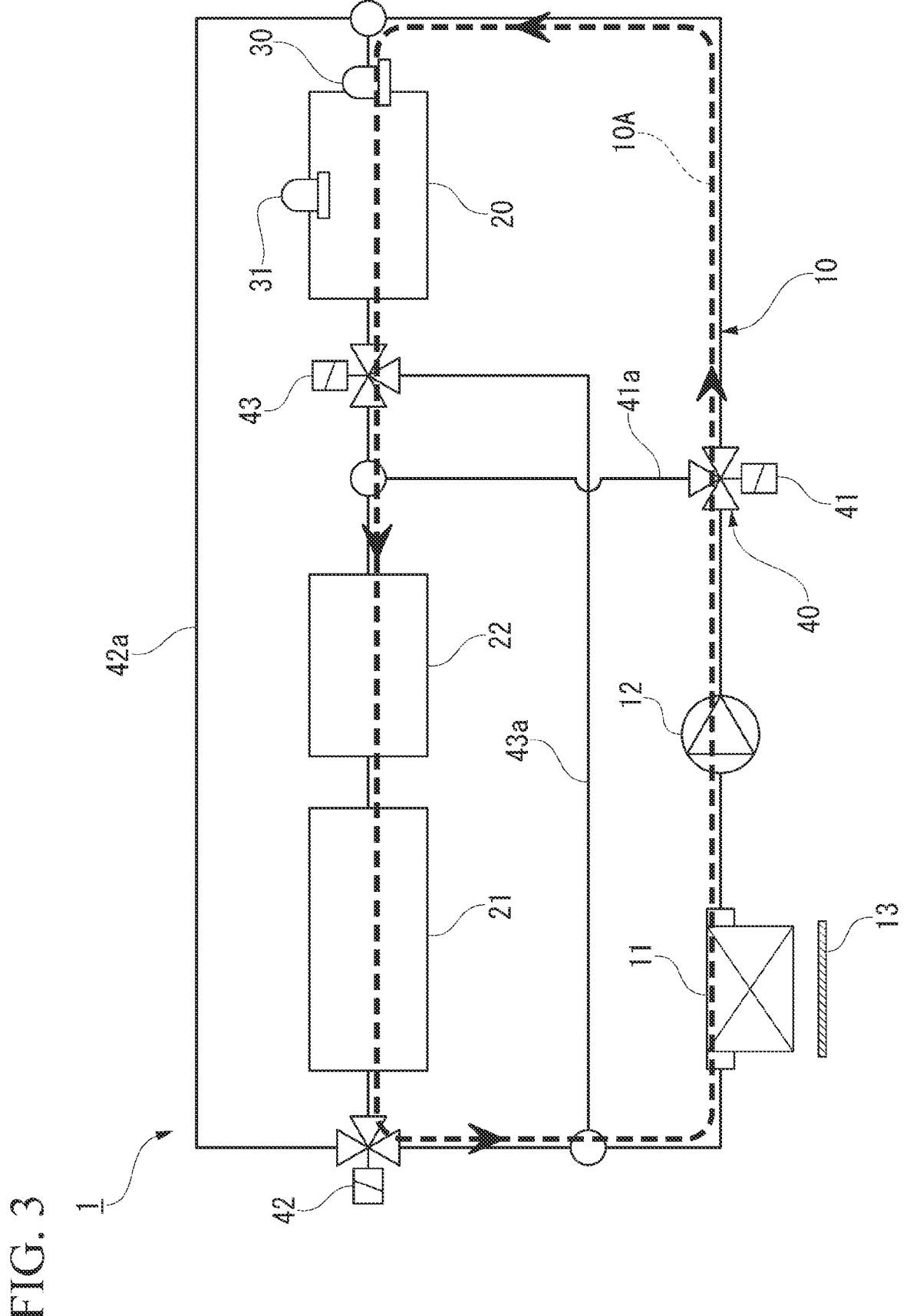
FIG. 3 is a view for describing a first temperature adjusting circuit according to the embodiment.

FIG. 3 is a view for describing the first temperature adjusting circuit 10A according to the embodiment.

As shown in FIG. 3, the first temperature adjusting circuit 10A is a circuit in which a heating medium sent out of the pump 12 is supplied to the battery 20, the charging device 22 and the driving device 21 in sequence and then is returned to the radiator 11.

Here, the first flow channel switching valve 41 connects a downstream side of the pump 12 and an upstream side of the battery 20. In addition, the second flow channel switching valve 42 connects a downstream side of the driving device 21 and an upstream side of the radiator 11. In addition, the third flow channel switching valve 43 connects a downstream side of the battery 20 and an upstream side of the charging device 22.

Figure 4:
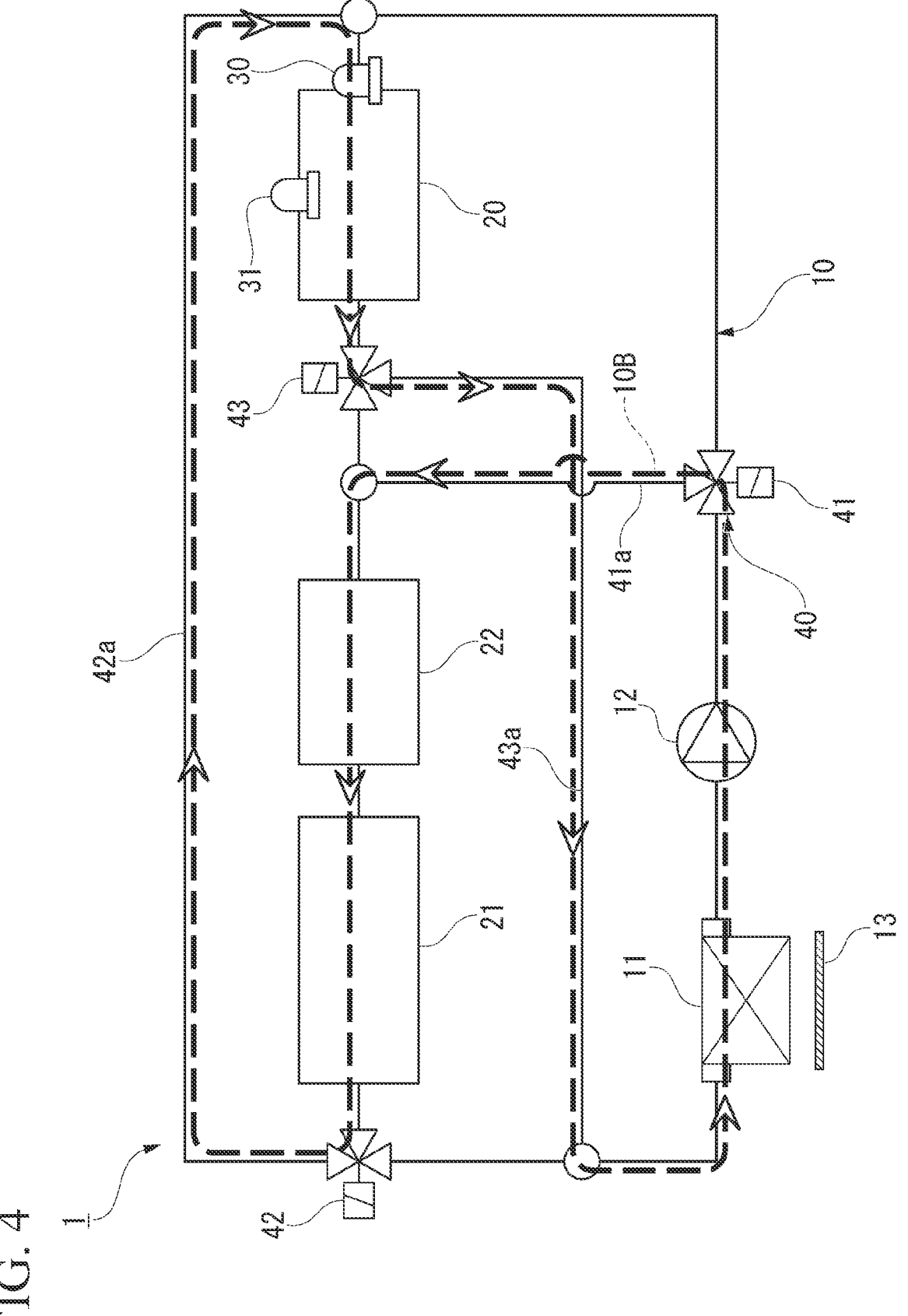
FIG. 4 is a view for describing a second temperature adjusting circuit according to the embodiment.

FIG. 4 is a view for describing the second temperature adjusting circuit 10B according to the embodiment.

As shown in FIG. 4, the second temperature adjusting circuit 10B is referred to as a circuit in which the heating medium sent out of the pump 12 is supplied to the charging device 22, the driving device 21 and the battery 20 in sequence and returned to the radiator 11.

Here, the first flow channel switching valve 41 connects a downstream side of the pump 12 and an upstream side of the charging device 22. In addition, the second flow channel switching valve 42 connects a downstream side of the driving device 21 and an upstream side of the battery 20. In addition, the third flow channel switching valve 43 connects a downstream side of the battery 20 and an upstream side of the radiator 11.

Figure 5:
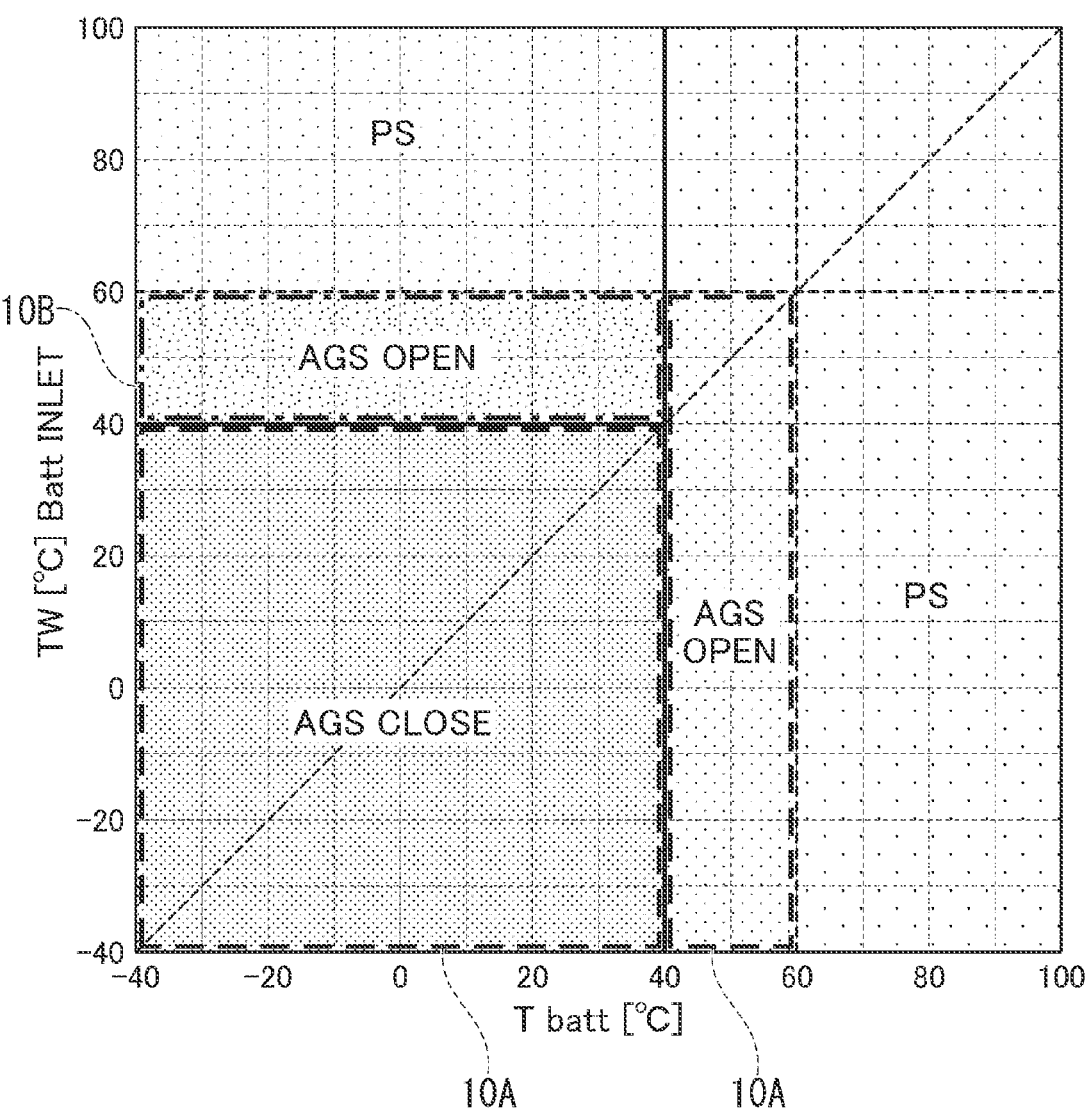
FIG. 5 is a view showing a control map of a control device according to the embodiment.

FIG. 5 is a view showing a control map of the control device 50 according to the embodiment.

As shown in FIG. 5, the control device 50 controls the flow channel switching device 40 and sets the temperature adjusting circuit 10 to the first temperature adjusting circuit 10A when a measurement result (TW) of the temperature sensor 30 (a temperature of the heating medium at the inlet of the battery 20) is less than 40° C. and a measurement result (Tbatt) of the temperature sensor 31 (a temperature of the battery 20 itself) is less than 40° C. Here, the opening/closing device 13 (ASG) of the radiator 11 is set to a closed state (CLOSE).

According to the control, the heating medium heated by heat exchange with the heat generating instrument (the driving device 21, the charging device 22) can be supplied to the low temperature battery 20 without cooling the heating medium with the radiator 11. Accordingly, the battery 20 can be heated from a low temperature output decrease state to a normal output state (for example, 40° C. to 60° C.) in which a required output can be produced.

In addition, the control device 50 controls the flow channel switching device 40 and switches the temperature adjusting circuit 10 from the first temperature adjusting circuit 10A to the second temperature adjusting circuit 10B in a case the measurement result (TW) of the temperature sensor 30 (the temperature of the heating medium of the inlet of the battery 20) is 40° C. or more and the measurement result (Tbatt) of the temperature sensor 31 (the temperature of the battery 20 itself) is less than 40° C. Here, the opening/closing device 13 (ASG) of the radiator 11 is set to an open state (OPEN).

According to the control, the heating medium cooled by the radiator 11 can be supplied to the heat generating instrument (the driving device 21, the charging device 22) before the battery 20. The fact that the temperature of the heating medium at the inlet of the battery 20 is higher than the temperature of the battery 20 itself means a state in which the heat generating instrument (the driving device 21, the charging device 22) is hotter than the battery 20. Accordingly, the heat generating instrument is preferentially cooled, and it is possible to prevent the heat generating instrument from becoming a high temperature (for example, 60° C. or more) and to prevent power save (PS) from being applied during the control.

In addition, the control device 50 controls the flow channel switching device 40 and switches the temperature adjusting circuit 10 from the second temperature adjusting circuit 10B to the first temperature adjusting circuit 10A in a case the measurement result (Tbatt) of the temperature sensor 31 (the temperature of the battery 20 itself) is 40° C. or more. Here, the opening/closing device 13 (ASG) of the radiator 11 is set to the open state (OPEN).

According to the control, the heating medium cooled by the radiator 11 can be supplied to the battery 20 prior to the heat generating instrument (the driving device 21, the charging device 22). Accordingly, the battery 20 can be preferentially cooled, and it is possible to prevent the battery 20 from becoming a high temperature (for example, 60° C. or more) and to prevent power save (PS) from being applied during the control.

According to the configuration, the temperatures of the battery 20 and the heat generating instrument can be managed appropriately by switching upstream and downstream of the battery 20 and the heat generating instrument (the driving device 21, the charging device 22) in the temperature adjusting circuit 10 on the basis of the temperature of the heating medium and the temperature of the battery 20.

In this way, the temperature adjusting device 1 according to the above-mentioned embodiment includes the temperature adjusting circuit 10 configured to circulate a heating medium, the temperature sensor 30 (the first temperature sensor) configured to measure a temperature of the heating medium, the battery 20 thermally connected to the temperature adjusting circuit 10 (the second temperature sensor), the temperature sensor 31 configured to measure a temperature of the battery 20, the heat generating instrument (the driving device 21, the charging device 22) thermally connected to the temperature adjusting circuit 10, the flow channel switching device 40 configured to switch a flow channel of the temperature adjusting circuit 10 so as to form the first temperature adjusting circuit 10A configured to circulate the heating medium in sequence of the battery 20 and the heat generating instrument and the second temperature adjusting circuit 10B configured to circulate the heating medium in sequence of the heat generating instrument and the battery 20, and the control device 50 configured to control the flow channel switching device 40 and to switch the temperature adjusting circuit 10 to the first temperature adjusting circuit 10A or the second temperature adjusting circuit 10B on the basis of measurement results of the temperature sensor 30 and the temperature sensor 31. According to the configuration, it is possible to obtain the temperature adjusting device 1 capable of appropriately managing temperatures of the battery 20 and the heat generating instrument and increasing response capability.

In addition, in the embodiment, the heat generating instrument has a thermal capacity smaller than that of the battery 20. According to the configuration, since there is a quick response with respect to the temperature of the heating medium and the temperature of the heat generating instrument, a heat generating state of the heat generating instrument can be managed on the basis of a change in temperature of the heating medium (the measurement result of the temperature sensor 30).

In addition, in the embodiment, in a case the measurement result of the temperature sensor 30 is 40° C. or more (a first threshold or more) and the measurement result of the temperature sensor 31 is less than 40° C. (less than the first threshold), the control device 50 controls the flow channel switching device 40 and switches the temperature adjusting circuit 10 from the first temperature adjusting circuit 10A to the second temperature adjusting circuit 10B. According to the configuration, when the temperature of the heating medium is higher than that of the battery 20, it is possible to preferentially cool the heat generating instrument having a smaller thermal capacity than the battery 20 having a larger thermal capacity.

In addition, in the embodiment, the radiator 11 thermally connected to the temperature adjusting circuit 10 and configured to cool the heating medium, and the opening/closing device 13 configured to open and close the radiator 11 are provided. According to the configuration, it is possible to switch between cooling and warming of the heating medium by opening and closing the opening/closing device 13.

In addition, in the embodiment, the control device 50 further controls the opening/closing device 13 and opens and closes the radiator 11 on the basis of the measurement results of the temperature sensor 30 and the temperature sensor 31. According to the configuration, a management capacity of the temperatures of the battery 20 and the heat generating instrument can be increased by switching the temperature adjusting circuit 10 and opening and closing the radiator 11.

In addition, in the embodiment, in a case the measurement result of the temperature sensor 30 is 40° C. or more (a second threshold or more) or the measurement result of the temperature sensor 31 is 40° C. or more (the second threshold or more), the control device 50 controls the opening/closing device 13 and switches the radiator 11 from a closed state to an open state. According to the configuration, when the battery 20 and the heat generating instrument reach a high temperature, the heating medium can be cooled. Further, in the embodiment, while the temperature (the first threshold) at which the temperature adjusting circuit 10 switches and the temperature (the second threshold) at which the radiator 11 opens and closes are the same at 40° C., they may be slightly different.

In addition, in the embodiment, the heat generating instrument includes the driving device 21 that drives the motor 23. According to the configuration, the battery 20 can be heated through the heating medium heated by the heat generated by the driving device 21.

In addition, in the embodiment, the heat generating instrument includes the charging device 22 that is electrically connected to the external power supply and that is configured to charge the battery 20. According to the configuration, it is possible to heat the battery 20 through the heating medium heated by the heat generated by the charging device 22.

Figure 6:
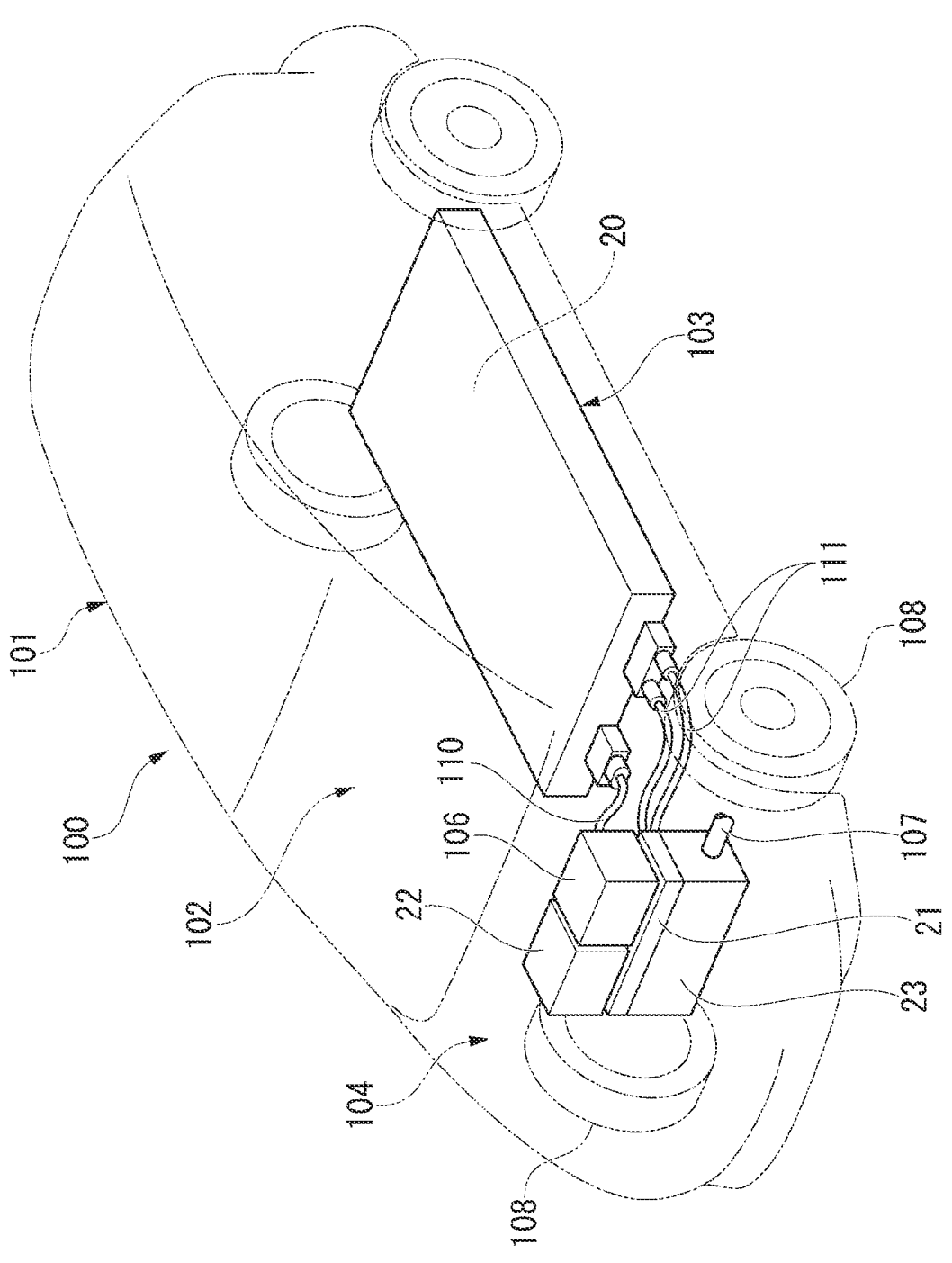
FIG. 6 is a perspective view showing a schematic configuration of a vehicle according to the embodiment.

FIG. 6 is a perspective view showing a schematic configuration of a vehicle 100 according to the embodiment.

In a vehicle body 101 of the vehicle 100, a battery case 103 configured to accommodate the battery 20 is mounted in a portion below a floor of a passenger compartment 102. A motor room 104 is provided in the front of the vehicle 100. The motor 23, the driving device 21, a branch unit 106, the charging device 22, and the like, are provided in the motor room 104.

A rotational driving force of the motor 23 is transmitted to a shaft 107. A front wheel 108 of the vehicle 100 is connected to both end portions of the shaft 107. The driving device 21 is disposed on an upper side of the motor 23 and directly fastened and fixed to a case of the motor 23. The driving device 21 is electrically connected to a connector of the battery case 103 by a power cable 111. In addition, the driving device 21 is electrically connected to the motor 23 by, for example, a three-phase pass bar. The driving device 21 controls driving of the motor 23 using electric power supplied from the battery 20.

The branch unit 106 and the charging device 22 are laterally disposed in parallel. The branch unit 106 and the charging device 22 are disposed above the driving device 21. The branch unit 106 and the charging device 22 are disposed while being separated from the driving device 21. The branch unit 106 and the battery case 103 are electrically connected by a cable 110 having connectors on both ends.

The branch unit 106 is electrically connected to the charging device 22. The charging device 22 is connected to a general external power supply such as a domestic power source or the like, and performs charging to the battery 20. The charging device 22 and the branch unit 106 are electrically connected by a cable (not shown) having connectors on both ends.

Since the vehicle 100 includes the temperature adjusting device 1, the temperatures of the battery 20 and the heat generating instrument can be managed as appropriate. In this way, since the temperature adjusting device 1 manages the temperatures of the battery 20 and the heat generating instrument as appropriate, an electric traveling distance is increased and vehicle efficiency is improved.

Hereinabove, while preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

For example, while the heating unit such as a heater dedicated to the heating medium is eliminated from the temperature adjusting circuit 10 of the temperature adjusting device 1 in the embodiment, the heating unit may be used in combination with the heat generation of the above-mentioned heat generating instrument.

What is claimed is:

1. A temperature adjusting device comprising:
   a temperature adjusting circuit configured to circulate a heating medium with a single pump;
   a first temperature sensor configured to measure a temperature of the heating medium;
   a battery thermally connected to the temperature adjusting circuit;
   a second temperature sensor configured to measure a temperature of the battery;
   a heat generating instrument thermally connected to the temperature adjusting circuit;
   a flow channel switching device configured to switch a flow channel of the temperature adjusting circuit at a downstream side of the pump so as to form a first temperature adjusting circuit configured to circulate the heating medium in sequence of the pump, the battery, and the heat generating instrument and a second temperature adjusting circuit configured to circulate the heating medium in sequence of the pump, the heat generating instrument, and the battery; and
   a control device configured to control the flow channel switching device and to switch the temperature adjusting circuit to the first temperature adjusting circuit or the second temperature adjusting circuit on the basis of measurement results of the first temperature sensor and the second temperature sensor.

2. The temperature adjusting device according to claim 1, wherein the heat generating instrument has a thermal capacity smaller than that of the battery.

3. The temperature adjusting device according to claim 2, wherein, in a case the measurement result of the first temperature sensor is a first threshold or more and the measurement result of the second temperature sensor is less than the first threshold, the control device controls the flow channel switching device and switches the temperature adjusting circuit from the first temperature adjusting circuit to the second temperature adjusting circuit.

4. The temperature adjusting device according to claim 1, comprising:

a radiator thermally connected to the temperature adjusting circuit and configured to cool the heating medium; and an opening/closing device configured to open and close the radiator.

5. The temperature adjusting device according to claim 4, wherein the control device further controls the opening/ closing device and opens and closes the radiator on the basis of the measurement results of the first temperature sensor and the second temperature sensor.

6. The temperature adjusting device according to claim 5, wherein, in a case the measurement result of the first temperature sensor is a second threshold or more or the measurement result of the second temperature sensor is the second threshold or more, the control device controls the opening/closing device and switches the radiator from a closed state to an open state.

7. The temperature adjusting device according to claim 1, wherein the heat generating instrument includes a driving device configured to drive a motor.

8. The temperature adjusting device according to claim 1, wherein the heat generating instrument includes a charging device that is electrically connected to an external power supply and that is configured to charge the battery.

9. A vehicle comprising the temperature adjusting device according to claim 1.

* * * * *